United States Patent
Gillilan

(10) Patent No.: US 8,641,794 B2
(45) Date of Patent: Feb. 4, 2014

(54) AIR FILTER AND AIR FILTER SYSTEM

(75) Inventor: Chrystal B. Gillilan, Ashville, OH (US)

(73) Assignee: Columbus Industries, Inc., Ashville, OH (US)

( * ) Notice: Subject to any disclaimer, the term of this patent is extended or adjusted under 35 U.S.C. 154(b) by 147 days.

(21) Appl. No.: 13/164,073

(22) Filed: Jun. 20, 2011

(65) Prior Publication Data

US 2011/0308209 A1 Dec. 22, 2011

Related U.S. Application Data

(60) Provisional application No. 61/356,067, filed on Jun. 18, 2010.

(51) Int. Cl.
*B01D 39/00* (2006.01)
(52) U.S. Cl.
USPC ............... 55/495; 55/481; 55/497; 55/499; 55/501; 55/503

(58) Field of Classification Search
USPC ............ 55/495, 481, 497, 499–501, 503, 521
See application file for complete search history.

(56) References Cited

U.S. PATENT DOCUMENTS

| 6,843,820 B2 * | 1/2005 | Kubokawa ................. 55/495 |
| 2004/0182055 A1 * | 9/2004 | Wynn ......................... 55/497 |

* cited by examiner

*Primary Examiner* — Robert Clemente
*Assistant Examiner* — Karla Hawkins
(74) *Attorney, Agent, or Firm* — Jason H. Foster; Kremblas & Foster

(57) ABSTRACT

An air filter and frame that cooperate to require alignment of the filter in a desired orientation in order for insertion to occur. At least one edge of the filter is offset from a right angle relative to other edges and the faces of the filter, and an obstruction is formed in the frame so that the filter can be inserted into the frame in only the desired orientation. Preferably two opposing edges of the frame are angled, and obstructions, such as small rails, are mounted in opposing sidewalls of the frame.

4 Claims, 6 Drawing Sheets

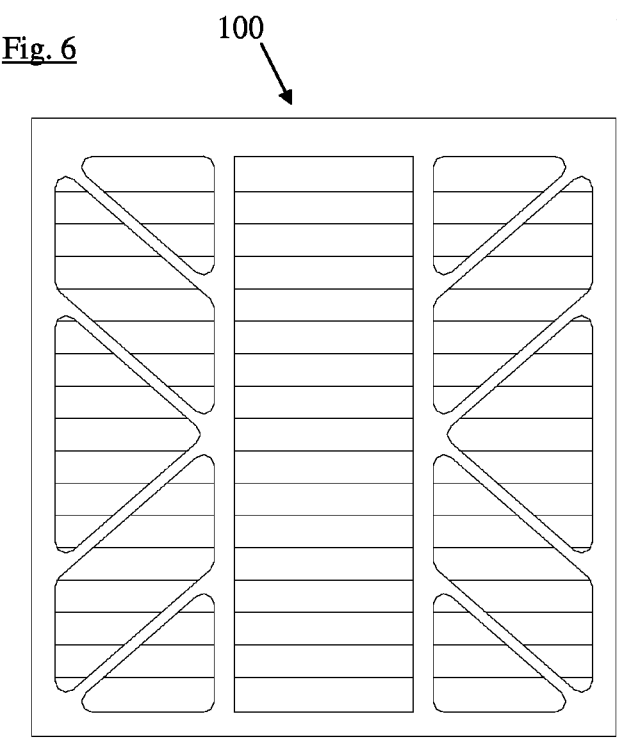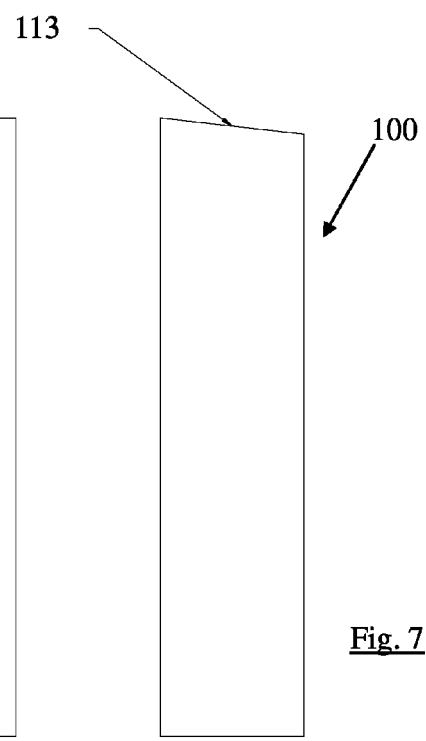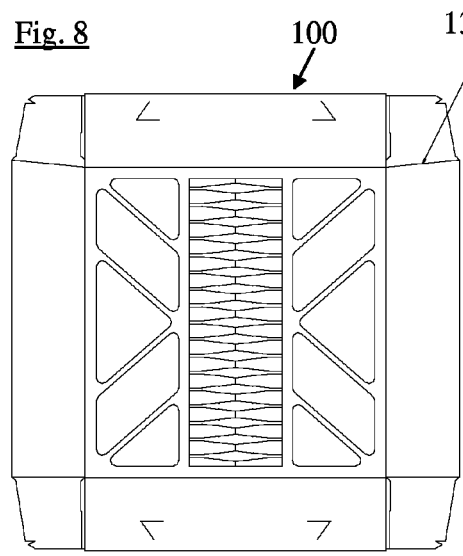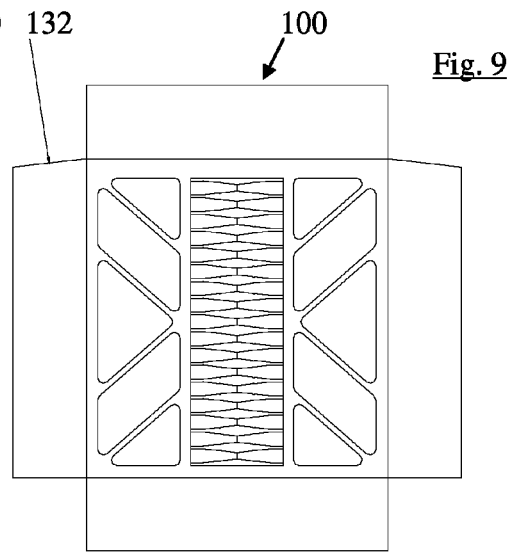

AIR FILTER AND AIR FILTER SYSTEM

CROSS-REFERENCES TO RELATED APPLICATIONS

This application claims the benefit of U.S. Provisional Application No. 61/356,067 filed Jun. 18, 2010. This provisional application is hereby incorporated by reference.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

The invention relates to filtration devices and systems in residential and commercial buildings for heating, ventilating and air conditioning (HVAC) the buildings.

A common conventional air filter, such as a furnace air filter, includes a porous filtration media that is oriented transverse to a path of air or other gas flow during use, such as at a position just upstream of a furnace's blower. A common configuration for such a filter includes a slot formed along the path of a cold air return duct. The slot is slightly thicker than the filter and is about as wide and deep as the filter. Therefore, a filter can be inserted into the slot through an opening on one side until the filter is completely inserted. Then a covering over the slot is closed and the furnace is used in a conventional manner.

Air drawn into the furnace for heating in the cooler seasons, and for cooling in the warmer seasons, passes through the porous filtration media to filter the air of particles greater than a predetermined size. The filtration of air keeps the operating components of the furnace and blower from being damaged by abrasion and/or corrosion caused by the particulate matter, and serves to "clean" the air in the building in which the furnace operates so that humans or animals breathe healthier air. With the configuration described above, air filters can be removed from the slot, when they become coated with particulate and reach the end of their useful lives, so they can be replaced as described above.

Because conventional air filters have a preferred orientation relative to the direction of air flow, they must be placed in the slot in the correct orientation. As an example, most air filters have an upstream side and a downstream side, and if air flows through the filter in the direction opposite the preferred direction, the filter does not operate with optimal efficiency. However, conventional slots for air filters permit the filter to be inserted in correct and incorrect orientations.

The need exists for a filter and a filter apparatus that encourages and/or requires the correct orientation of the filter relative to air flow.

BRIEF SUMMARY OF THE INVENTION

The invention provides a "key" that functions as a direction indicator for the filter when it is inserted into the filter frame. Panel filters are known that fold to different shapes along 90 degree folds. The invention uses folds that are slightly off from right angles. The final shape of the filter is thus unique because the non-right angle folds result in a filter with edges that are angled on at least one end at an angle other than a right angle.

The filter is similar to traditional filters and can be made out of a die cut two-piece chipboard frame. However, the filter has score lines positioned as shown in the illustrations so that, when folded, the filter has one side or a portion of that side that is not perpendicular to the other sides, nor is it parallel to any other sides.

The invention is a gas filtration apparatus that includes a substantially planar gas filter and a frame for inserting the filter into. The term "gas filtration" is used herein to refer to any gaseous material that is filtered of particulate. Typically, the gas being filtered is air. The filter has parallel front and rear faces and peripheral edges. At least one of the filter's edges is aligned relative to the front face at an angle substantially greater than 90 degrees, and aligned relative to the rear face at an angle substantially less than 90 degrees. This angled edge will prevent insertion other than as desired.

The frame has at least one sidewall and a substantially planar void into which the filter is inserted when the filter is inserted in a desired orientation. This maintains the gas filter in a path of gas flow so that the filter can filter particles from the gas. An obstruction, such as a rail, is formed on the frame sidewall for accommodating the first edge of the filter when the filter is inserted into the void in the desired orientation of the frame, and for interfering with a second edge of the filter when the filter is aligned with the void in an undesired orientation.

In a preferred embodiment, there is a second receptacle frame sidewall and a second angled edge. The second angled edge is formed by another of the filter's edges aligned relative to the front face at an angle substantially greater than 90 degrees and relative to the rear face at an angle substantially less than 90 degrees. Furthermore, an obstruction is formed on the second frame sidewall for accommodating the second angled edge of the filter when the filter is inserted into the void in the desired orientation of the frame, and for interfering with an edge of the filter when the filter is aligned with the void in an undesired orientation.

BRIEF DESCRIPTION OF THE SEVERAL VIEWS OF THE DRAWINGS

FIG. 6 is a rear view illustrating an alternative filter embodying the present invention.

FIG. 7 is a side view illustrating the alternative filter of FIG. 6.

FIG. 8 is a rear view illustrating a paperboard blank that, when folded, forms the filter of FIG. 6.

FIG. 9 is a rear view illustrating the paperboard blank of FIG. 8 with tabs folded.

Figure 1:
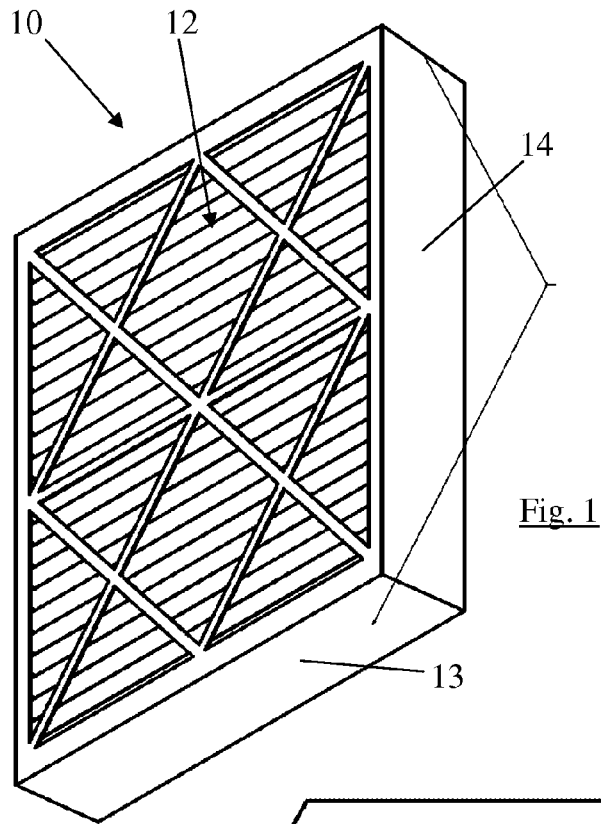
FIG. 1 is a rear view in perspective illustrating a filter that includes features of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/356,067 filed Jun. 18, 2010 is incorporated in this application by reference.

A filter 10 is shown in FIG. 1 having a rear face 12 and edges 13, 14, 15 (opposite the edge 13 and not visible in FIG. 1) and 16 (opposite the edge 14 and not visible in FIG. 1). The term "rear" indicates the orientation of the filter relative to airflow in which the rear face is the downstream face when in the preferred orientation. The edges 15 and 16 are visible in FIG. 3. The front face 11, which is parallel to and on the opposite side of the filter 10 as the rear face 12, is not visible in FIG. 1. The front face 11 is visible in FIG. 3 and is the first face that air or other gas impacts when the filter 10 is the preferred, operable orientation.

The filter 10 is desirably inserted into a slot or other void formed in a rigid frame when installed correctly in an operable position. The preferred frame 20 has two spaced, opposing sidewalls 23 and 25 that are each joined at one of their ends by the ends of the sidewall 26, and at the opposite of their ends by the beams 24a and 24b. The frame 20 is typically steel or aluminum, but any strong material will suffice. It is preferred that the frame 20 is mounted in, or at the furnace end of, a cold air return duct in a conventional manner to permit filters, such as the filter 10, to be inserted therein and removed therefrom for replacement when they approach the end of their useful life.

The elongated gap between the beams 24a and 24b is slightly wider than the thickness of the filter 10. This gap forms an opening to the slot of the frame 20, and this opening permits the filter 10 to be inserted into the frame 20 as described below for mounting relative thereto. The frame 20 is thus a rigid structure that is attached in the flow path of the gas to be filtered and in which the filter 10 can be mounted.

Because the filter 10 has a front face 11 that is designed to receive air flowing toward it, and a rear face 12 that is designed to be oriented away from the incoming air, it is important that the filter 10 be oriented in the correct manner relative to air flow. The invention contemplates the formation of structures on the filter 10, and obstructions on the frame 20, to permit insertion of the filter 10 into the frame 20 only in the desired orientation.

Figure 2:
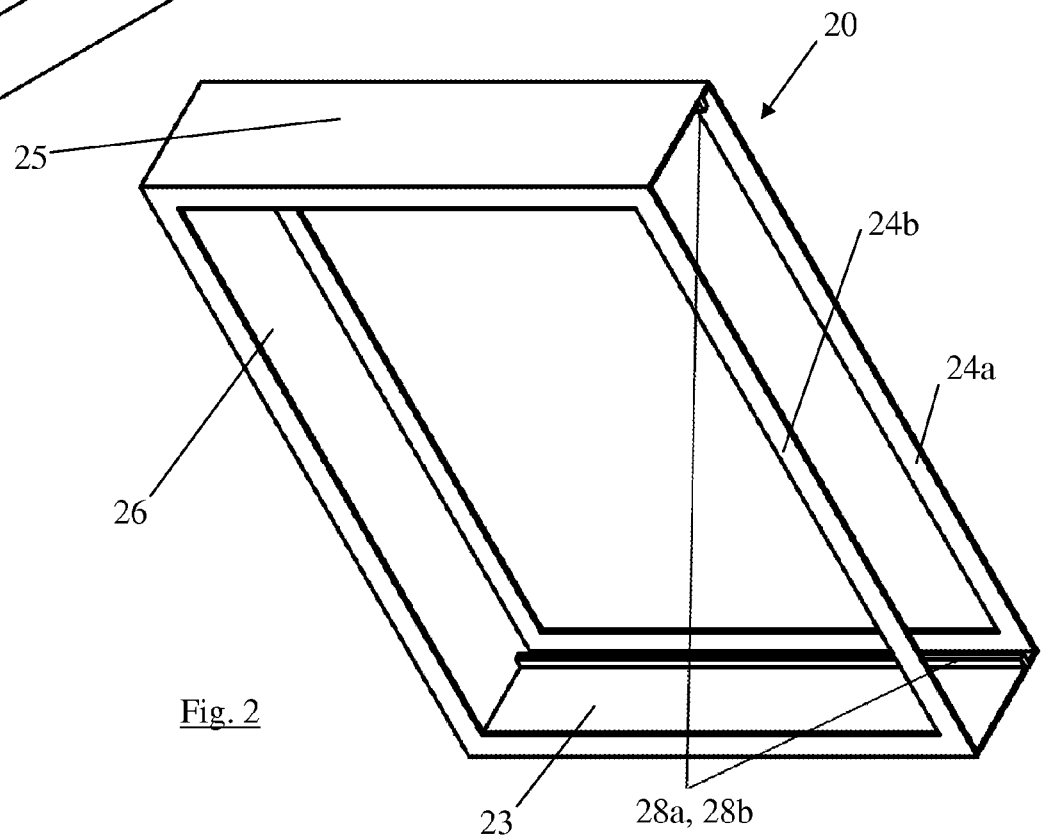
FIG. 2 is a view in perspective illustrating a frame that defines a slot into which the filter of FIG. 1 is designed to be inserted.
Figure 3:
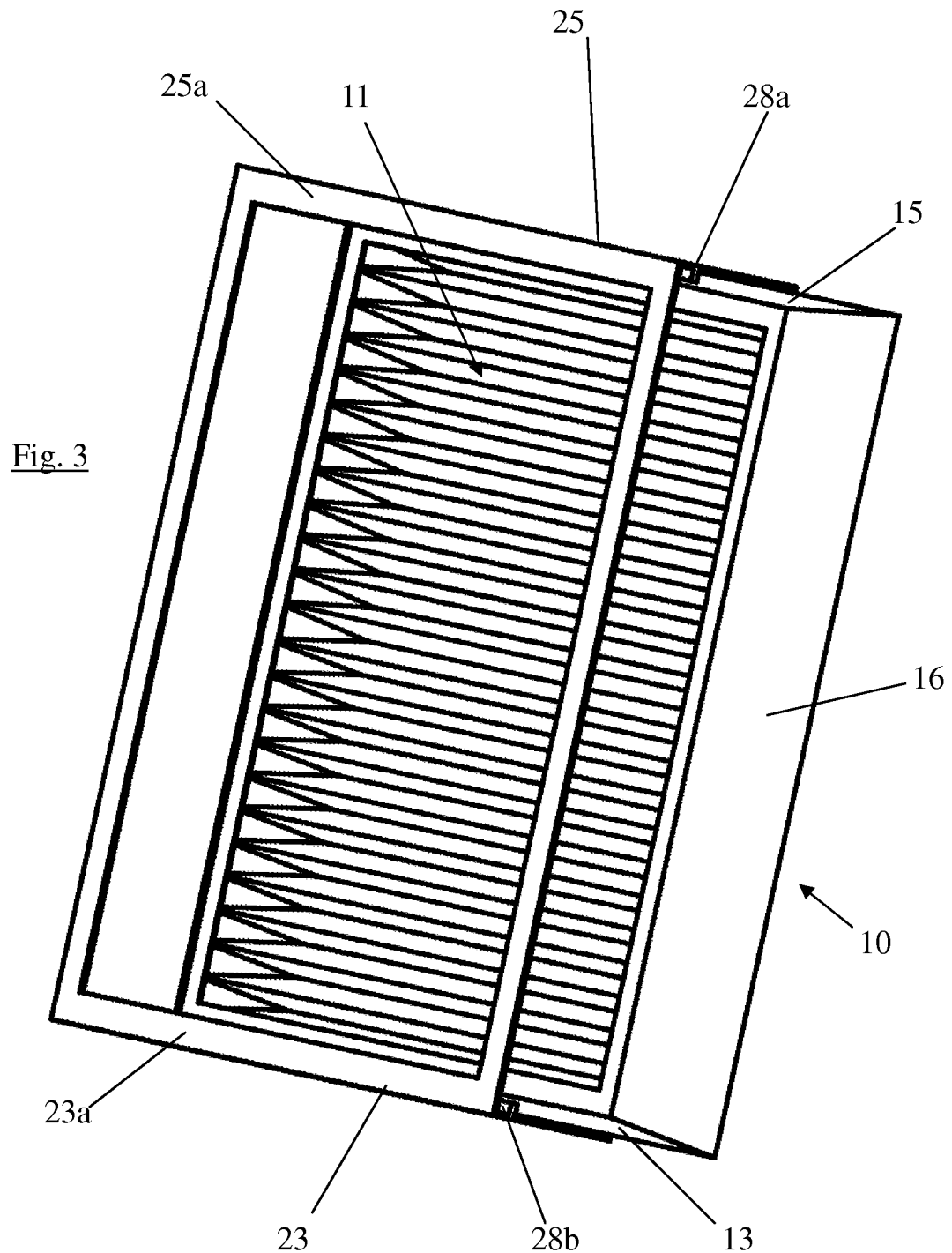
FIG. 3 is a front view in perspective illustrating the combination of the filter of FIG. 1 inserted in the slot formed in the frame of FIG. 2.
Figure 4:
FIG. 4 is a top view illustrating the combination of FIG. 3.

The preferred such obstruction structures on the frame 20 are the rails 28a and 28b that are mounted in the frame 20 as shown in FIGS. 2-4. As shown most clearly in FIG. 3, the rail 28a is mounted to the sidewall 25, and is oriented parallel to, and spaced from, the lip 25a formed at one edge of the sidewall 25. Similarly, the rail 28b is mounted to the sidewall 23, and is oriented parallel to, and spaced from, the lip 23a formed at one edge of the sidewall 23. The rails 28a and 28b occupy space, and thereby create a possible obstruction, in the slot near the front face 11 when the filter 10 is inserted in the frame 20, for reasons related to the unique shape of the filter 10 that will now be described. Of course, the rails 28a and 28b could be mounted on the opposite sides of the sidewalls 23 and 25, as will become apparent from the description below to the person having ordinary skill.

The edges 13 and 15 of the filter 10 are angled from 90 degrees relative to the front face 11 and the rear face 12. The angle between the edge 13 and the front face 11 is about 95 degrees, and therefore the angle between the edge 13 and the rear face 12 is about 85 degrees. The angles between the edge 15 and the front and rear faces 11 and 12 are similar. It will become apparent from the description herein that the angles need not be exactly 85 and 95 degrees, but can be any angle from about 60 to about 120 degrees. What is important is that the filter 10 has edges that are angled to avoid an obstruction, such as the rails 28a and 28b, in the slot when the filter 10 is oriented correctly, and other edges that abut the obstruction in the frame 20 when the filter is oriented incorrectly and an insertion is attempted.

The rails 28a and 28b are about one-half inch square and extend substantially the entire length of the sidewalls 23 and 25. Of course, discontinuous rails could be used instead. The size of the gaps between the rails 28a and 28b and the lips 25a and 23a, respectively, is determined by the angled edges 13 and 15 on the filter 10. The rails 28a and 28b are positioned to allow the filter 10 to be inserted in the correct orientation into the frame 20 and prevent the filter 10 from being inserted into the frame 20 in the incorrect orientation. A contemplated size for the gaps between the rails 28a and 28b and the lips 25a and 23a is about one-half inch when the filter 10 is about four inches thick, the edges 13 and 15 are angled as described above, and the rails 28a and 28b are about one-half inch square. Of course, the person having ordinary skill will understand that more severely angled edges of a filter would accommodate larger rails, and less severely angled edges would accommodate smaller rails.

Figure 5:
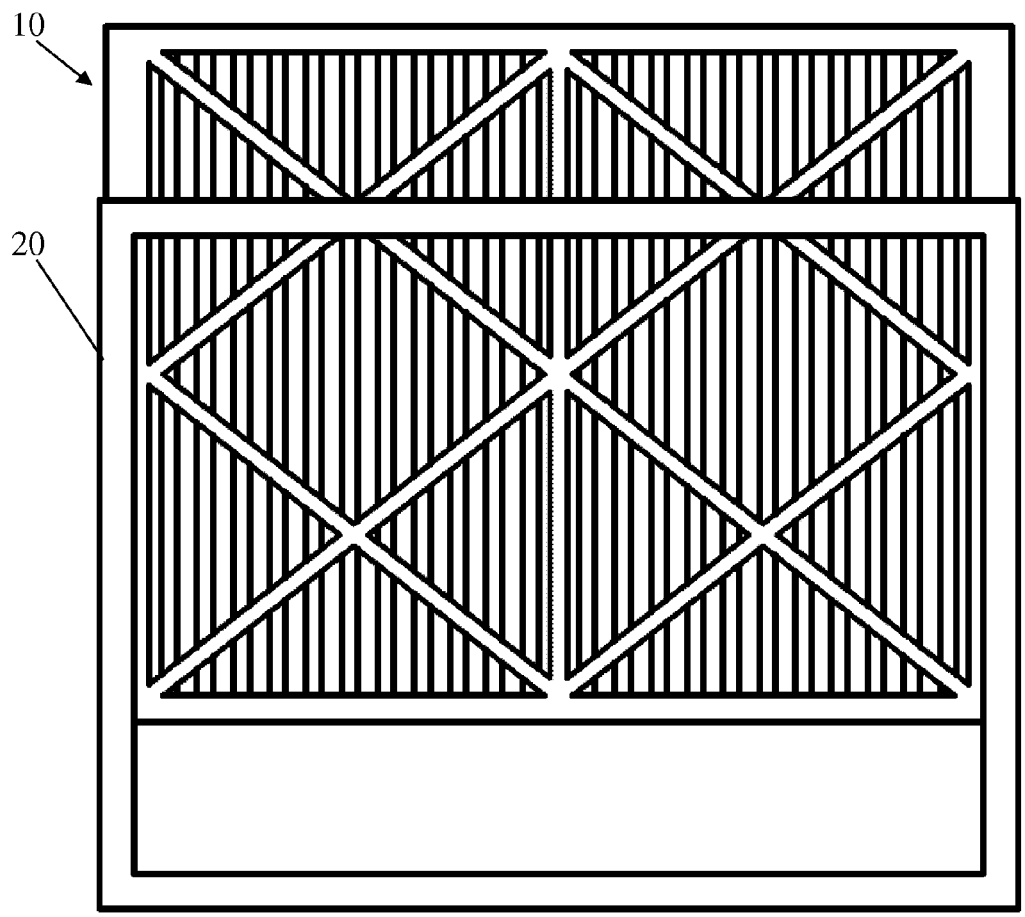
FIG. 5 is a rear view illustrating the combination of FIG. 3.

When the filter 10 is inserted correctly into the slot of the frame 20, as shown in FIGS. 3-5, triangular gaps are formed between the edges 13 and 15 and the sidewalls 23 and 25, respectively, as best seen in FIG. 4. The rails 28a and 28b fit within these triangular gaps, and therefore the rails 28a and 28b do not obstruct the insertion of the filter 10 into the frame 20 in any appreciable manner when the filter 10 is correctly oriented relative to the frame 20. However, if the filter 10 is rotated 180 degrees so that the rear face 12 is closest to the lips 23a and 25a, the rails 28a and 28b would extend outside of the triangular gaps that would be formed (if it were possible to insert the filter 10 into the frame 20). Because the relative sizes of the rails 28a and 28b and the triangular gaps prohibit this orientation of the filter 10, the filter 10 simply abuts the ends of the rails 28a and 28b when insertion is first attempted, and the rails 28a and 28b thereby serve as an obstruction to insertion. A similar situation arises if the filter is rotated so that the front face 11 is at the correct side, but the incorrect edges are closest to the rails 28a and 28b. Therefore, the angled edges of the filter 10 and the rails 28a and 28b in the slot provide a "lock and key" configuration that requires the filter to be inserted into the slot in the desired orientation before insertion can advance past the initial stage. This results in the installer of the filter inserting the filter correctly relative to airflow or not installed at all.

Figure 13:
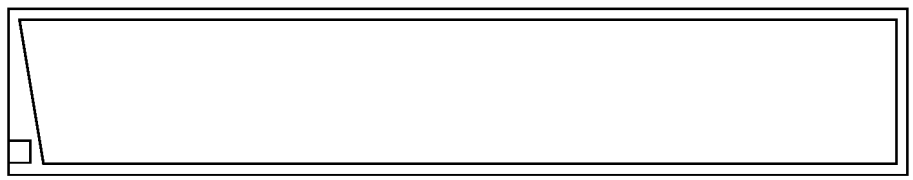
FIG. 13 is a schematic view in section illustrating an alternative embodiment of the present invention.

Although the filter 10 has two angled edges, a filter can have only one such angled edge and still provide a similar orientation-correcting configuration. Such a filter 100 is shown in FIGS. 6, 7 and 13. The blank of paperboard that is used to form the filter 100 is shown in FIGS. 8 and 9. The tabs 130 and 132 are cut and/or scored to form the angled edge 113 when folded. Such a filter 100 can be inserted in a frame, which can be identical to the frame 20, as long as only one of the rails 28a and 28b is in place, as shown in FIG. 13.

Figure 14:
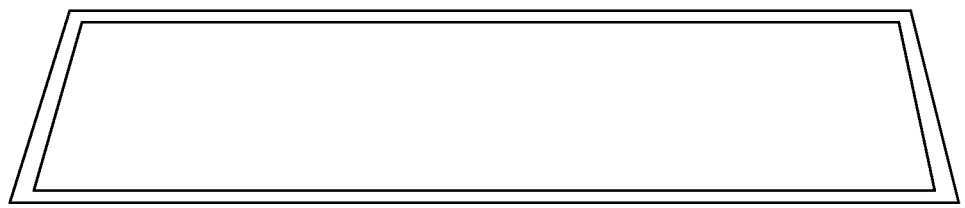
FIG. 14 is a schematic view in section illustrating an alternative embodiment of the present invention.
Figure 15:
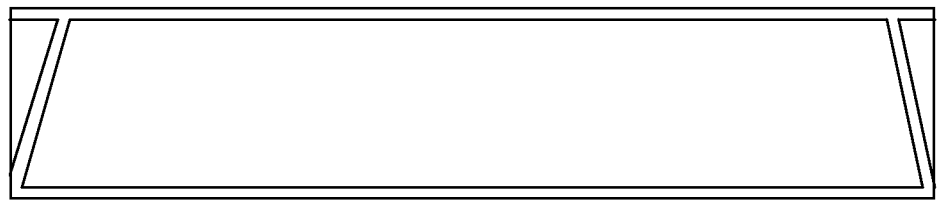
FIG. 15 is a schematic view in section illustrating an alternative embodiment of the present invention.

As an alternative to the rails 28a and 28b, it is contemplated that the sidewalls 23 and 25 can be angled to be substantially parallel to the angled edges 13 and 15 of the filter 10, as shown in FIG. 14. Another alternative contemplated is triangular rails mounted to the sidewalls 28a and 28b, thereby occupying the triangular gaps formed between the sidewalls 23 and 25 and the edges 13 and 15. This is shown in FIG. 15. Any shape is contemplated as replacing the rails 28a and 28b, as long as the shape accommodates the filter when it is in the desired orientation, and obstructs the filter when it is in other than the desired orientation.

Figure 10:
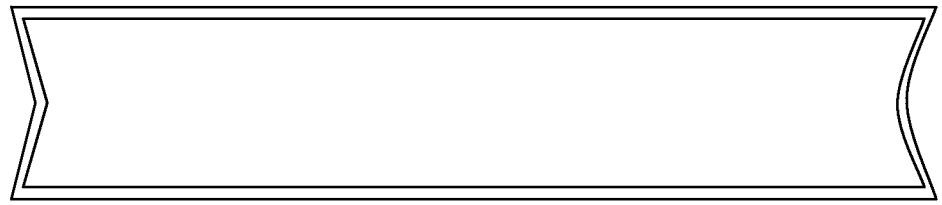
FIG. 10 is a schematic view in section illustrating an alternative embodiment of the present invention.
Figure 11:
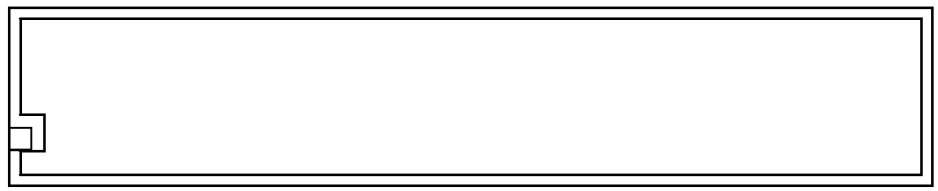
FIG. 11 is a schematic view in section illustrating an alternative embodiment of the present invention.
Figure 12:
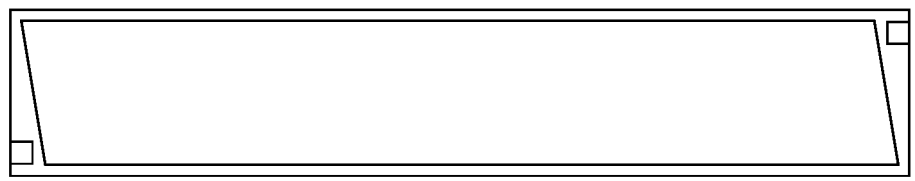
FIG. 12 is a schematic view in section illustrating an alternative embodiment of the present invention.

As a further contemplated alternative, the edges of the filter can be curved, wavy, V-shaped (see FIG. 10) or otherwise strategically shaped, as long as the sidewalls of the frame are cooperatively shaped, in order to require the filter to be oriented correctly in order to be inserted into the slot of the frame. Still further, FIG. 12 shows that a "parallelogram" shape combined with strategically located rails can be substituted for the preferred embodiment. Additionally, as shown in FIG. 11, irregular shapes can be use to require the correct orientation of the filter, but it should be noted that such shapes may require the use of non-paperboard material, such as plastic. Once the concept of the "lock and key" is developed, it will become apparent that there are perhaps innumerable alternatives to the preferred embodiment described above.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A gas filtration apparatus comprising:
   (a) a substantially planar gas filter having a filter frame with substantially parallel front and rear faces and first and second peripheral edges on a perimeter of the filter, and filtration media within the filter frame, wherein at least the first filter frame edge is substantially planar and is aligned relative to the front face at an angle substantially greater than 90 degrees, and aligned relative to the rear face at an angle substantially less than 90 degrees;
   (b) a gas filter receptacle frame having at least one sidewall defining a substantially planar void into which the filter is inserted in a direction substantially parallel to a plane of the filter, when the filter is inserted in a desired orientation, for maintaining the gas filter in a path of gas flow; and
   (c) an obstruction formed on said at least one receptacle frame sidewall for accommodating the first edge of the filter frame during insertion of the filter into the void in the desired orientation of the filter, and for interfering with the second edge of the filter frame during insertion of the filter into the void in an undesired orientation of the filter.

2. The gas filtration apparatus in accordance with claim 1, further comprising a second receptacle frame sidewall, a third of the filter frame's edges is aligned relative to the filter's front face at an angle substantially greater than 90 degrees and aligned relative to the filter's rear face at an angle substantially less than 90 degrees and an obstruction is formed on the second receptacle frame sidewall for accommodating the third edge of the filter during insertion of the filter into the void in the desired orientation of the filter, and for interfering with a fourth edge of the filter during insertion of the filter into the void in an undesired orientation of the filter.

3. A gas filtration apparatus comprising:
   (a) a substantially planar gas filter having a substantially gas-impermeable filter frame containing a substantially gas-permeable filtration media, the filter frame having substantially parallel front and rear faces and peripheral edges on a perimeter of the filter, wherein at least a first of the filter frame's gas impermeable edges is substantially planar and is aligned relative to the front face at an angle substantially greater than 90 degrees, and aligned relative to the rear face at an angle substantially less than 90 degrees;
   (b) a gas filter receptacle frame having at least one sidewall and a substantially planar void into which the filter is inserted, during filtration of a gas through the filter's substantially gas-permeable filtration media when the filter is inserted in a direction substantially parallel to a plane of the filter in a desired orientation, for maintaining the gas filter in a path of gas flow; and
   (c) an obstruction formed on said at least one receptacle frame sidewall for accommodating the first substantially gas-impermeable edge of the filter frame when the filter is inserted into the void in the desired orientation of the gas filter receptacle frame, and for interfering with a second edge of the filter frame when the filter is aligned with the void in an undesired orientation.

4. A gas filter for use in a gas filter receptacle frame having at least one sidewall defining a substantially planar void into which the filter is configured for insertion in a desired orientation for maintaining the gas filter in a path of gas flow, the filter comprising:
   (a) a substantially planar gas filter having a filter frame with substantially parallel front and rear faces and peripheral edges on a perimeter of the filter, and filtration media within the filter frame, wherein at least a first filter frame edge is substantially planar and is aligned relative to the front face at an angle substantially greater than 90 degrees, and aligned relative to the rear face at an angle substantially less than 90 degrees to form a cavity that, when the filter frame is inserted into the void in a direction substantially parallel to a plane of the filter in the desired orientation of the filter, receives an obstruction formed on said at least one receptacle frame sidewall, and wherein a second edge of the filter frame is configured to interfere with the obstruction during attempted insertion of the filter into the void in an undesired orientation of the filter.

* * * * *

UNITED STATES PATENT AND TRADEMARK OFFICE
CERTIFICATE OF CORRECTION

PATENT NO. : 8,641,794 B2  
APPLICATION NO. : 13/164073  
DATED : February 4, 2014  
INVENTOR(S) : Chrystal B. Gillilan Page 1 of 1

It is certified that error appears in the above-identified patent and that said Letters Patent is hereby corrected as shown below:

In the Claims

Column 6, Claim 3(b), line 31, after the word "inserted," add --in a direction substantially parallel to a plane of the filter,--

Column 6, Claim 3(b), line 33, after the word "inserted," cancel --in a direction substantially parallel to a plane of the filter--

Signed and Sealed this  
Twenty-second Day of April, 2014

Michelle K. Lee  
*Deputy Director of the United States Patent and Trademark Office*